(12) United States Patent
Croxford et al.

(10) Patent No.: US 11,513,597 B2
(45) Date of Patent: Nov. 29, 2022

(54) HUMAN-MACHINE INTERFACE SYSTEM

(71) Applicant: Arm Limited, Cambridge (GB)

(72) Inventors: Daren Croxford, Swaffham Prior (GB); Guy Larri, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 17/211,107

(22) Filed: Mar. 24, 2021

(65) Prior Publication Data

US 2022/0308667 A1 Sep. 29, 2022

(51) Int. Cl.
| | |
|---|---|
| *G06F 3/01* | (2006.01) |
| *G06F 3/033* | (2013.01) |
| *G06N 3/08* | (2006.01) |
| *G06N 3/04* | (2006.01) |
| *A63F 13/212* | (2014.01) |
| *G05B 13/02* | (2006.01) |
| *A63F 13/24* | (2014.01) |
| *A63F 13/235* | (2014.01) |

(52) U.S. Cl.
CPC .......... *G06F 3/015* (2013.01); *A63F 13/212* (2014.09); *G05B 13/027* (2013.01); *G06F 3/013* (2013.01); *G06F 3/033* (2013.01); *G06N 3/0454* (2013.01); *G06N 3/08* (2013.01); *A63F 13/235* (2014.09); *A63F 13/24* (2014.09); *A63F 2300/1012* (2013.01); *A63F 2300/1031* (2013.01); *A63F 2300/1043* (2013.01)

(58) Field of Classification Search
CPC .......... G06F 3/015; G06F 3/013; G06F 3/033; A63F 13/212; G05B 13/027; G06N 3/0454; G06N 3/08
See application file for complete search history.

(56) References Cited

U.S. PATENT DOCUMENTS

| | | | |
|---|---|---|---|
| 2014/0364703 A1* | 12/2014 | Kim | A61B 5/6824 600/301 |
| 2020/0137380 A1* | 4/2020 | Supikov | G06N 3/0454 |
| 2021/0158630 A1* | 5/2021 | Muhammad | G06F 3/016 |
| 2021/0362040 A1* | 11/2021 | Bellippady | A63F 13/218 |

OTHER PUBLICATIONS

Wikipedia, "Electromyography", Mar. 4, 2021, https://en.wikipedia.org/wiki/Electromyography.
(Continued)

*Primary Examiner* — Hang Lin
(74) *Attorney, Agent, or Firm* — EIP US LLP

(57) ABSTRACT

A human-machine interface system comprises a sensor configured to generate data associated with a human movement, such as measured electrical signals or data from an accelerometer. A measurement unit of the human-machine interface measures user movement over time to generate a sequence of measured user movement data. A processor processes the data associated with a human movement from the sensor using a trained neural network to determine one or more predicted user actions. A comparison unit compares the one or more predicted user actions with one or more user actions obtained from the sequence of measured user movement data. A control unit uses the predicted user actions to control a process in an information processing apparatus in dependence upon the comparison performed by the comparison unit.

9 Claims, 9 Drawing Sheets

(56) References Cited

OTHER PUBLICATIONS

Muralidharan et al., "Early detection of hand movements from EEGs for stroke therapy applications", May 27, 2011, National Center for Biotechnology Information, U.S. National Library of Medicine.
Tuttle, Will, "Xbox Series X: What's the Deal with Latency?" Mar. 16, 2020, https://news.xbox.com/en-us/2020/03/16/xbox-series-x-latency/.
Labrador, Christian Alexander Oliveros, "Improved Sampling for Temporal Anti-Aliasing", Jun. 5, 2018, Department of Computer Science Faculty of Engineering LTH, Lund University.
Deangelis, M., "Google wants to reduce Stadia lag with 'negative latency'", Oct. 10, 2019, Engadget, https://www.engadget.com/2019-10-10-google-stadia-negative-latency.html.
Gaming, Tobii, "How to enhance your Elite Dangerous adventure with the 4C", Apr. 21, 2017, The Tobii Blog, https://blog.tobii.com/how-to-enhance-your-elite-dangerous-adventure-with-the-4c.

* cited by examiner

HUMAN-MACHINE INTERFACE SYSTEM

BACKGROUND OF THE INVENTION

Field of the Invention

The present invention relates to a human-machine interface system and a method thereof. Human-machine interface systems include human-computer interface systems.

Description of the Related Technology

Latency between a user and a computer relates generally to how quickly the computer appears to respond to a user's input. For example, when using a computer that is under heavy processing load, a person typing text may experience a feeling that the text on screen appears to be lagging and that there is a perceptible delay between typing on a keyboard and the display of corresponding characters on the display. In many circumstances, with modern computers, the delay is not noticeable for ordinary users. Latency in input to computers goes beyond text entry and may apply in circumstances beyond delays caused by heavy processing loads. For example, in computer gaming, there is usually a short delay, typically measured in milliseconds, between an action being instructed on a gaming controller and a reaction to the gaming controller input appearing on a display. This delay may be caused by time taken to measure the user's input to the controller, time to transmit a control signal from the controller to a games console, time taken to generate image frames in response to the user's input and time taken to transfer the image and drive the television to display the new images.

Various steps can be taken to reduce latency in the context of gaming. For example, increasing the refresh rate of a display used for gaming has an effect of reducing latency because the screen refreshes more often and allowing a response to a user's input to be displayed more quickly.

Another approach that has been suggested is to improve synchronization between sampling of inputs of the gaming controller and demands for the inputs by the gaming console. In this way, the inputs from the gaming controller may be received more closely to when they are needed by the gaming console thereby reducing latency. This has been referred to as 'Dynamic Latency Input' by Microsoft a registered trademark (RTM) of Microsoft Corporation.

Cloud/remote gaming, in which a game is run on a cloud service and played from a user device connected to the cloud service is a developing technology. As the game is run on a cloud service or a remote device, remote from a user, communication times are typically longer than with local computer interfaces and the need to manage latency is important as a factor in providing a responsive gaming experience.

SUMMARY

According to a first aspect there is provided a human-machine interface system comprising: a sensor configured to generate data associated with a human movement; a measurement unit configured to measure user movement over time to generate a sequence of measured user movement data; a processing unit configured to process the data associated with a human movement from the sensor using a trained neural network to determine a plurality of predicted user actions; a comparison unit configured to compare the one or more predicted user actions of the plurality of predicted user actions with one or more user actions obtained from the sequence of measured user movement data; and a control unit configured to use one or more predicted user actions of the plurality of predicted user actions to control a process in an information processing apparatus in dependence upon the comparison performed by the comparison unit.

According to a second aspect there is provided a method for a human-machine interface system, the method comprising: generating, at a sensor, data associated with a human movement; measuring, by a measurement unit, user movement over time to generate a sequence of measured user movement data; processing, by a processing unit, the data associated with a human movement from the sensor using a trained neural network to determine a plurality of predicted user actions; comparing, by a comparison unit, one or more predicted user actions of the plurality of predicted user actions with one or more user actions obtained from the sequence of measured user movement data; and controlling, by a control unit, use of one or more predicted user actions of the plurality of predicted user actions to control a process in an information processing apparatus in dependence upon the comparison performed by the comparison unit.

According to a third aspect there is provided a non-transitory computer-readable storage medium comprising a program that, when executed by a human-machine interface system causes the human-machine interface system to perform a method comprising: generating, at a sensor, data associated with a human movement; measuring, by a measurement unit, user movement over time to generate a sequence of measured user movement data; processing, by a processing unit, the data associated with a human movement from the sensor using a trained neural network to determine a plurality of predicted user actions; comparing, by a comparison unit, one or more predicted user actions of the plurality of predicted user actions with one or more user actions obtained from the sequence of measured user movement data; and controlling, by a control unit, use of one or more predicted user actions of the plurality of predicted user actions to control a process in an information processing apparatus in dependence upon the comparison performed by the comparison unit.

BRIEF DESCRIPTION OF THE DRAWINGS

Embodiments will be described with reference to the accompanying drawings in which.

DETAILED DESCRIPTION

Figure 1:
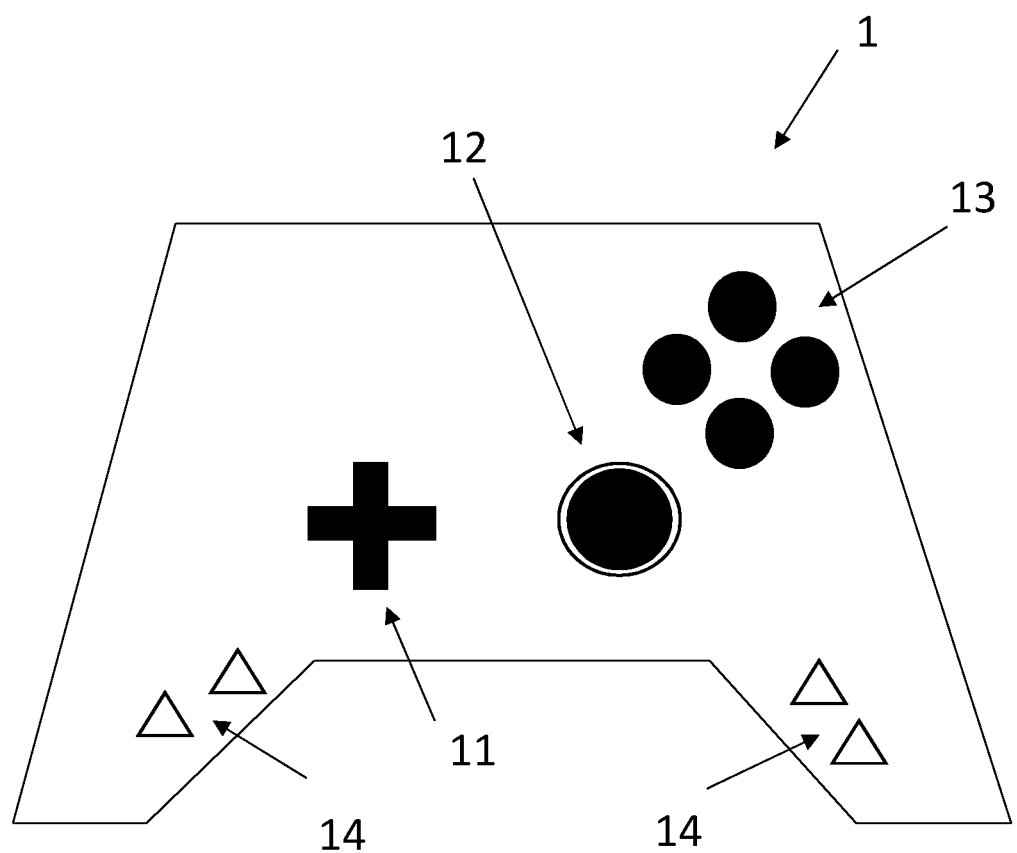
FIG. 1 depicts a view of a gaming controller.

Specific embodiments will be described with reference to the figures. However certain more general aspects and embodiments are first described.

A first embodiment provides a human-machine interface system comprising: a sensor configured to generate data associated with a human movement; a measurement unit configured to measure user movement over time to generate a sequence of measured user movement data; a processing unit configured to process the data associated with a human movement from the sensor using a trained neural network to determine a plurality of predicted user actions; a comparison unit configured to compare one or more predicted user actions of the plurality of predicted user actions with one or more user actions obtained from the sequence of measured user movement data; and a control unit configured to use one or more predicted user actions of the plurality of predicted user actions to control a process in an information processing apparatus in dependence upon the comparison performed by the comparison unit.

The one or more predicted user actions used to control the process in the information processing apparatus may be controlled based on the result of comparison, by the comparison unit, of one or more previous predicted user actions of the plurality of predicted user actions. In this way, one or more predicted user actions may be used to control the process in the information processing apparatus before those predicted user actions are compared with one or more user actions obtained from the sequence of measured user movement data. In other words, the one or more predicted user actions compared by the comparison unit may be used to control the use of predicted user actions subsequently determined using the neural network.

The sequence of measured user movement data may be one of: a sequence of measurements by the measurement unit of a user input device and a sequence of direct measurements of a user. In some embodiments the user input device may be one of: a button, a joystick, a four-way controller, a touch pad, a trigger, keyboard, and a mouse. In other embodiments the direct measurement of the user may be performed by an eye-tracking sensor to track eye movement. In other implementations, the direct measurement of the user could be performed by an accelerometer or a camera recording a user's movements.

The sensor may be configured to collect one or more electrical signals from a user and generate electrical signal data from the one or more collected electrical signals, wherein the electrical signal data is the data associated with a human movement.

The sensor may be a sensor comprising one or more surface electrodes positioned for contact with a user's skin. The sensor may comprise a band to be worn by a user around an arm or wrist of a user. The band may comprise one or more surface electrodes for contact with a user's skin. In other implementations, the human-machine interface system comprises a controller to be held by a user. The controller may be a gaming controller, extended reality controller, a mouse, or any other type of controller held or worn by a user. The sensor may comprise one or more surface electrodes on the surface of the controller for contact with a user's skin. In further embodiments, the sensor may comprise one or more electrode patches that may be placed on skin of a user. In yet further embodiments, the sensor may comprise electrodes in a glove. In further embodiments, the sensor may comprise one or more intra-muscular electrodes inserted into the body of a user. In other embodiments, the sensor may comprise an accelerometer.

The neural network may be a convolutional neural network (CNN) and/or a recurrent neural network. The neural network may be configured to receive a sequence of data associated with a human movement that is associated with a first time window. The processor may be configured to generate a predicted user action and a timing of the predicted user action. The neural network may be configured to receive a sequence of data associated with a human movement that is associated with a first time window and predict a sequence of predicted user movement data in a second time window. The second time window may be later than the first time window. The processor may be configured to identify a predicted user action from the predicted user movement data. The processor may be configured to identify an estimated time of the predicted user action from the predicted user movement data associated with the second time window.

In other embodiments the neural network may be configured to predict a type of user action from a plurality of types of user action.

The comparison unit may be configured to compare a type of the predicted user action with a type of a corresponding user action from the measured user movement data (some time later). The comparison unit may be configured to determine the presence or absence of a user action in the measured user movement data that corresponds to a predicted user action.

The comparison unit may be configured to monitor a failure rate at which predicted user actions do not have a corresponding user action or the type of a corresponding user action from the measured user movement data does not match a predicted type of user action. The comparison unit may be configured to compare the failure rate with a predetermined threshold. The control unit may be configured to control the use of the predicted user actions to control the process in the information processing apparatus in dependence upon whether or not a failure rate exceeds the predetermined threshold. The control unit may be configured to control the process in the information processing apparatus to use the user actions obtained from the measured user movement data in a case that the failure rate exceeds the predetermined threshold. The control unit may be configured to control the process in the information processing apparatus to use the predicted user actions in a case that the failure rate is less than or equal to the predetermined threshold.

The human-machine interface system may be operable to train the neural network based on data associated with a human movement generated by the sensor and measured user movement data generated by measurement unit. The human-machine interface may comprise a display configured to display instructions to direct a user to perform predetermined user actions while data associated with a human movement from the sensor is recorded and user movement is measured by the measurement unit in order to create training data. The training data may comprise the recorded data associated with a human movement and measured user movement data generated by the measurement unit. The training data may be used to train the neural network. The human-machine interface system may be configured to collect training data including data associated with a human movement and measured user movement data during use of the human-machine interface system and to train the neural network based on the collected training data.

The human-machine interface system may further comprise a second sensor configured to generate further data associated with a human movement. The processor may be configured to process the further data associated with a human movement from the second sensor using a second trained neural network to determine a plurality of predicted user actions. The comparison unit may be configured to compare one or more of the predicted user actions from the second trained neural network to the one or more measured user actions from the sequence of measured user movement data. The control unit may be configured to use at least one of: one or more predicted user actions from the trained neural network, one or more predicted user actions from the second trained neural network, and the one or more measured user actions to control the process in the information processing apparatus in dependence upon comparisons performed by the comparison unit. In some cases, the control unit may be configured to use predicted user actions from both the first neural network and the second neural network. In such cases, the predicted user actions from the first and second neural networks may be used if they agree (i.e. both the first neural network and second neural network generate corresponding predictions for the same predicted user action). In some implementations, the first and second neural networks may each be configured to predict a timing for the predicted user actions. In such implementations, if the first and second neural networks agree, a timing of a predicted user action may be based on an average of the time predicted for the predicted user action by the first and second neural networks.

In some embodiments the sensor and the second sensor may be located on different devices. The sensor and second sensor may be configured to generate data associated with a human movement from different parts of a user. The processing unit may be configured to receive the data associated with a human movement from the sensor and the further data associated with a human movement from the second sensor and to process the received data associated with a human movement and further data associated with a human movement using the trained neural network.

In some embodiments the processing unit may be configured to process the data associated with a human movement using a plurality of trained neural networks associated with a user to determine a plurality of predicted user actions. The comparison unit may be configured to compare one or more predicted user actions from the plurality of trained neural networks with one or more user actions obtained from the sequence of measured user movement data. The comparison unit may be configured to determine a most reliable trained neural network of the plurality of trained neural networks associated with the user based on the comparison. The control unit may be configured to use one or more predicted user actions from the neural network determined by the comparison unit to be the most reliable trained neural network to control the process in the information processing apparatus. In other embodiments, the processing unit may process data associated with a human movement using a current neural network of the plurality of neural network and may be configured to select another neural network from the plurality of neural networks in dependence upon a failure rate of predicted actions from the current neural network compared, by the comparison unit, to user actions from the measured user movement data. The human-machine interface system may be configured to initiate, in a case in which all failure rates associated with the plurality of trained neural networks associated with a user are above a threshold failure rate, a process for training a further neural network.

The comparison unit may be configured to separately monitor failure rates at which predicted user actions do not have a corresponding user action (a user action of the same type within a predetermined time of each other) from the measured user movement data for different types of user action and to compare the failure rates with one or more predetermined threshold values.

The human-machine interface system may be configured to provide the user actions obtained from the sequence of measured user movement data to the process in the information processing apparatus. The control unit may be configured to selectively provide one of the predicted user actions and the user actions obtained from the sequence of measured user movement data to the process in the information processing apparatus. In embodiments in which the comparison unit separately monitors failure rates for different types of user action, the control unit may be configured to selectively provide, depending on the failure rate for each type of user action, one of the predicted user actions and the user actions for each type of user action to the process in the information processing apparatus.

The control unit may be configured to use the one or more predicted user actions to control an image rendering process in the information processing apparatus in dependence upon the comparison performed by the comparison unit. In such embodiments, using the one or more predicted user actions may allow rendering of images with lower latency than by using the one or more user actions obtained from the sequence of measured user movement data. The control unit may be configured to control the rendering process to use one of the one or more predicted user actions and one or more user actions obtained from the sequence of measured user movement data in dependence upon a failure rate of the predicted user actions determined by the comparison unit. The rendering process may be a predictive rendering process in which one or more advance frames are rendered in accordance with one or more predicted user actions. The predictive rendering process may comprise a confirmation step in which a measured user action is checked against the predicted user action before the one or more advance frames are sent for display.

The process in the information processing apparatus may be a gesture recognition process. The process in the information processing apparatus may be a process associated with a game or a process associated with extended reality, such as augmented reality or virtual reality.

The human-machine interface system may be configured to apply a timestamp to one or more user actions obtained from the sequence of measured user movement data. The human-machine interface may be configured to apply a timestamp to one or more predicted user actions. The human-machine interface may be configured to apply a time offset to one or more predicted user actions relative to corresponding user actions obtained from the sequence of measured user movement data. The time offset may be a fixed time offset. In other implementations, the time offset may be determined based on a predicted time offset determined based on output of the neural network.

A second embodiment provides a method for a human-machine interface system, the method comprising: generating, at a sensor, data associated with a human movement; measuring, by a measurement unit, user movement over time to generate a sequence of measured user movement data; processing, by a processing unit, the data associated with a human movement from the sensor using a trained neural network to determine a plurality of predicted user actions; comparing, by a comparison unit, one or more predicted user actions of the plurality of predicted user actions with one or more user actions obtained from the sequence of measured user movement data; and controlling, by a control unit, use of one or more predicted user actions of the plurality of predicted user actions to control a process in an information processing apparatus in dependence upon the comparison performed by the comparison unit.

A third embodiment provides a non-transitory computer-readable storage medium comprising a program that, when executed by a human-machine interface system causes the human-machine interface system to perform a method comprising: generating, at a sensor, data associated with a human movement; measuring, by a measurement unit, user movement over time to generate a sequence of measured user movement data; processing, by a processing unit, the data associated with a human movement from the sensor using a trained neural network to determine a plurality of predicted user actions; comparing, by a comparison unit, one or more predicted user actions of the plurality of predicted user actions with one or more user actions obtained from the sequence of measured user movement data; and controlling, by a control unit, use of one or more predicted user actions of the plurality of predicted user actions to control a process in an information processing apparatus in dependence upon the comparison performed by the comparison unit.

Specific embodiments will now be described with reference to the figures.

FIG. 1 is a view of a gaming controller 1. The gaming controller 1 is generally formed of a main body and two hand grips. On the main body, a four-way controller 11 and a joystick 12 are provided. A group of buttons 13 is provided above the joystick 12. The four-way controller 11, joystick 12 and group of buttons 13 form input devices of the controller 1. In other embodiments, further input devices, such as triggers, touch screens, clickers, etc. may be provided on the gaming controller 1.

Two groups of electrodes 14 are provided on the controller 1, one group being provided on each hand grip. The electrodes 14 are positioned so that, in use, they can contact the skin of a user's hand. Although the electrodes 14 are shown in the hand grips in this embodiment, they may be provided on other parts of the controller 1 depending on controller design. The electrodes 14 are configured to read differential voltages across a surface of skin of a user holding the gaming controller 1. In some embodiments the electrodes may provide a stimulus, such as an electrical differential waveform to the electrodes 14 and measure voltage or current when in contact with the skin. In other embodiments the electrodes may be passive. As will be explained further below, the electrodes 14 form part of an electromyograph. More particularly, the electrodes 14 are suitable for surface electromyography and can measure electrical signals from the surface of a user's skin when the skin is in contact with the electrodes 14.

Figure 2:
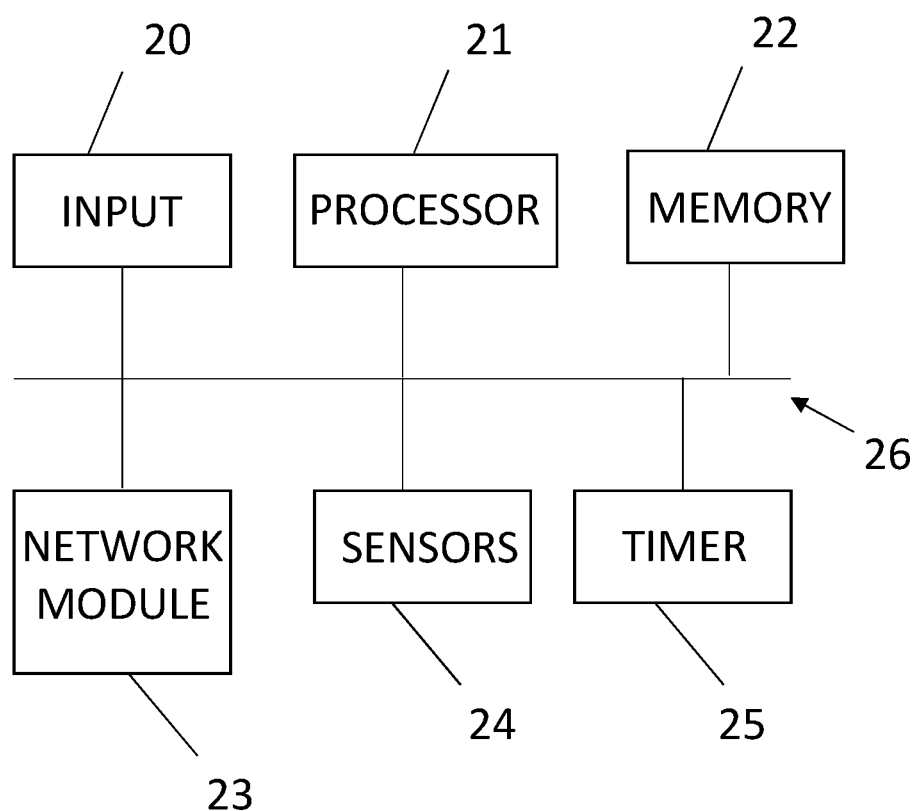
FIG. 2 is a schematic diagram of components of the gaming controller.

FIG. 2 is a schematic diagram of components of the gaming controller 1. The gaming controller 1 includes the input devices 20 (four-way controller 11, joystick 12, group of buttons 13 etc. and associated control and input circuitry) described above, a processor 21, a storage in the form of memory 22, a network module 23, sensors 24 in the form of electrodes 14 described above, and a timer 25. The components may communicate with each other over a bus 26. Further components may be provided but are not shown or described.

Figure 3:
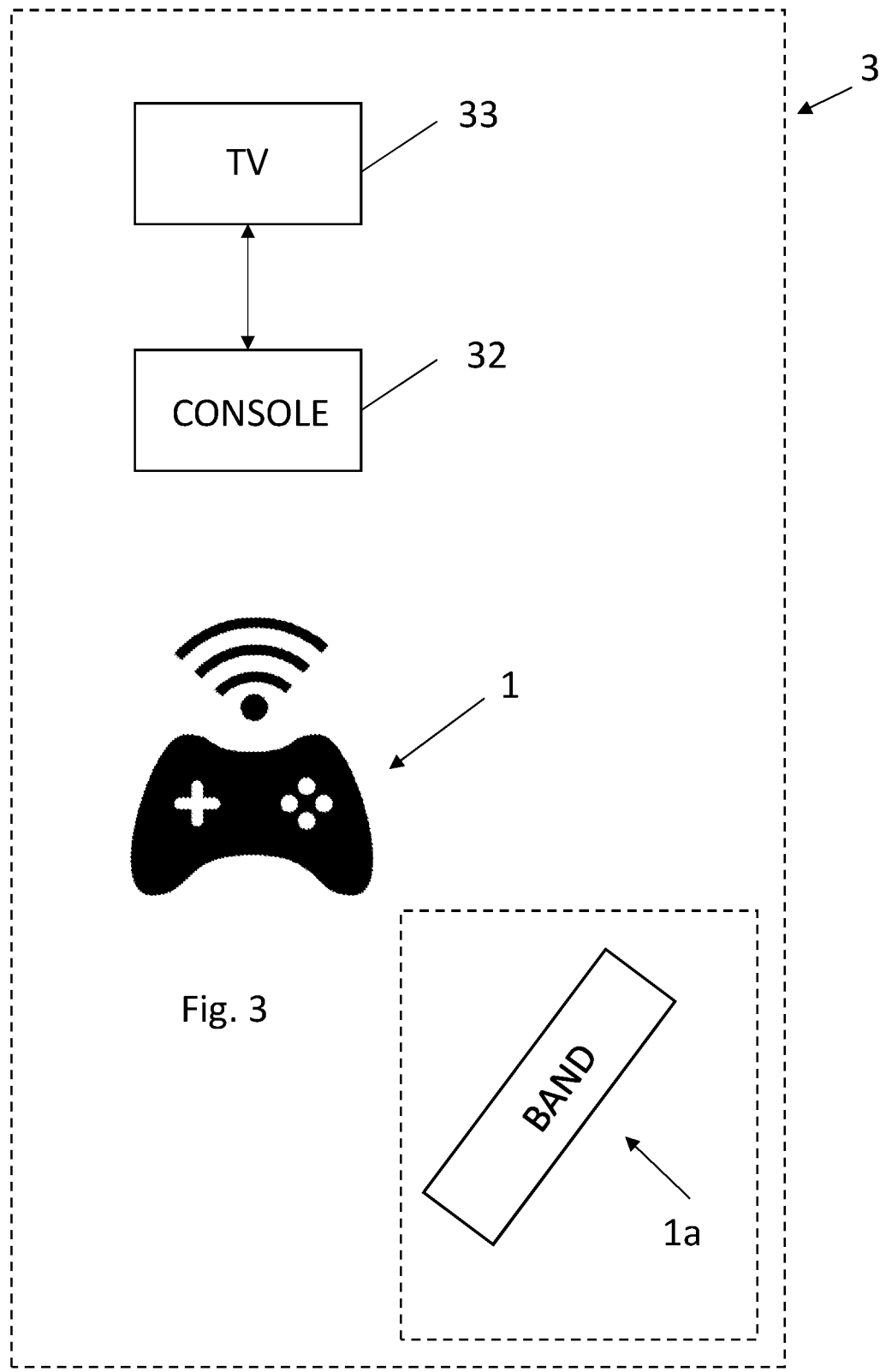
FIG. 3 is a schematic diagram of a gaming system including the gaming controller.

FIG. 3 is a schematic diagram of a human-machine interface system in the form of a gaming system 3 including the gaming controller 1. The gaming controller 1 is wirelessly connected to a console 32. The controller 1 forms a wireless connection using network module 23. The network module 23 may use any suitable wireless protocol, examples being Bluetooth® and Wi-Fi® direct. In other embodiments, the controller 1 could be connected to the console 32 by a wired connection.

The console 32 is connected to a display in the form of a television 33. In other implementations the display may be a monitor. The console 32 may be connected to the television 33 using any suitable connection, but in this embodiment uses a wired HDMI connection. The console 32 is configured to output images to the television 33 for display on the television screen.

FIG. 3 also shows an optional band 1a, which may be worn by a user and connected to the controller 1. Embodiments including a band 1a will be described later, but the present embodiment does not include band 1a.

As noted above, the controller 1 acts as an electromyograph. The memory 22 of the controller 1 stores a neural network that has been trained using signals from the electrodes 14 and is configured to infer user actions during use of the controller 1, such as for gaming or other activities.

During use of the controller 1, the timer 25 in the controller 1 generates a timer signal which is used by other components within the controller 1. The outputs from the input devices 20 are measured periodically based on the timer signal from the timer 25 by a measurement unit in the form of processor 21. Similarly, the electrical signals from the sensors 24 are also sampled periodically in accordance with the timer signal to generate electrical signal data. In the present embodiment a common timer signal is used throughout the controller 1, but in other embodiments different timer signals may be used for different input devices 20 and/or sensors 24.

Signals from the input devices 20, such as a signal indicating whether a button 13 is depressed, are measured periodically in accordance with the timer signal to generate a sequence of measured user movement data. The sequence of measured user movement data may vary depending upon the type of input device 20 and could include signals from a switch, such as a button 13, or information on the position or relative positions of the joystick 12.

The neural network may be a convolutional neural network. In this embodiment, the neural network is a recurrent neural network (RNN). An input layer of the RNN is configured to receive the sampled electrical signals measured from skin of a user by the electrodes 14. In some implementations, the electrical signals may be pre-processed, for example to reduce noise in the signal, remove unwanted frequencies, or to conduct a Fourier transform so that the input is a spectrogram etc.

The output of the trained RNN is a prediction of measurements of the input devices, such as the four-way controller 11, the joystick 12 or group of buttons 13.

Figure 7:
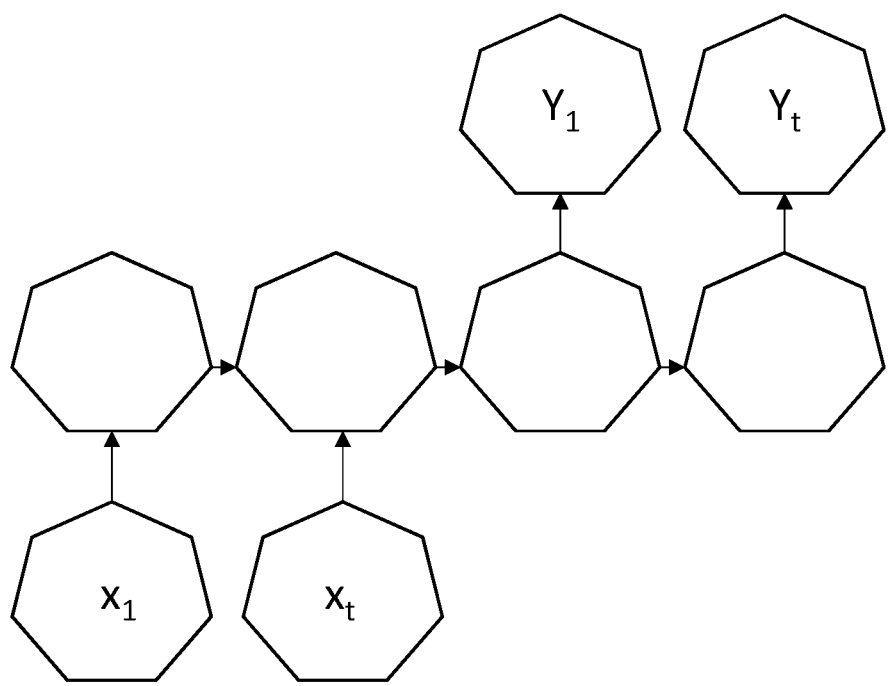
FIG. 7 is a schematic diagram of a recurrent convolutional neural network.

A RNN is used in this embodiment because such networks are suitable for processing series of data and can take into account past (or future) values in the sequence of data. In some embodiments, the RNN is configured in a many-to-many configuration such that a window of input values is used to predict a later window of output values. Such a configuration is illustrated in FIG. 7. At the bottom of FIG. 7, input values $X_1$ to $X_t$ are shown. Only two input values are shown in the figure, but these can represent any number of values in an input value time window. At the top of FIG. 7 output values $Y_1$ to $Y_t$ are shown. Again, only two values are shown in the figure, but these can represent any number of values in an output value time window. In between the input values and output values are a number of hidden layers of the neural network. Four hidden layers are shown for illustration only and there may be any number of hidden layers. For the purposes of the embodiments, the input values correspond (subject to pre-processing) to electrical signal data relating a first time window. The output values from the neural network correspond to predicted measurements of the input devices 20. As it is expected that the measurements from the electrodes 14 will precede the actions measured from the input devices 20, the first time window associated with the electrical signal data is earlier than a second time window associated with the predicted measurements from the input devices 20. By setting the time windows appropriately during training of the RNN it is possible to identify predicted user actions that are predicted based on electrical signal data generated by measuring electrical signals from the electrodes 14. The predicted user action are identified from the predicted measurements from the input devices generated by the RNN. By looking at the sequence of predicted measurements from the input devices it is possible to predict when (i.e. the delay) between the electrical signal data is measured and the predicted user action.

In order to train the neural network, a user is instructed to hold the controller 1 and perform a series of user actions such as pressing the buttons 13, moving the joystick 12 etc. The training of the RNN and the display of user instructions may be triggered by the loading of a game on the console 32, connection of the controller 1 to the console 32 or some other action. The instructions may be displayed to the user on the television 33. As the user performs the user actions on the controller 1, the electrical signals from the electrodes 14 are sampled to generate electrical signal data and the outputs of the input devices 20 are measured to generate user movement data. The electrical signal data and the user movement data may be combined to generate training data. The training data is stored in the memory 22 of the controller 1.

The RNN is then trained using the training data. The training involves conventional back-propagation techniques for training feed-forward neural networks using a loss function. The options for training a RNN based on a sequence of electrical signal data and associated user movement data to generate a neural network for predicting the user movement data are known to the skilled person and are not set out in detail here.

The training of the RNN may take place at the controller 1 or may take place elsewhere, such as on the console 32. In a case in which the training takes place on the console 32, the recorded training data is sent from the controller 1 to the console 32, the training of the RNN takes place on the console 32 and the parameters (filter values etc.) of the trained RNN are sent from the console 32 back to the controller 1. Such implementations may be beneficial for the battery-life of the controller 1 and may also speed up the user experience as typically significantly more processing power will be available at the console 32.

Figure 4:
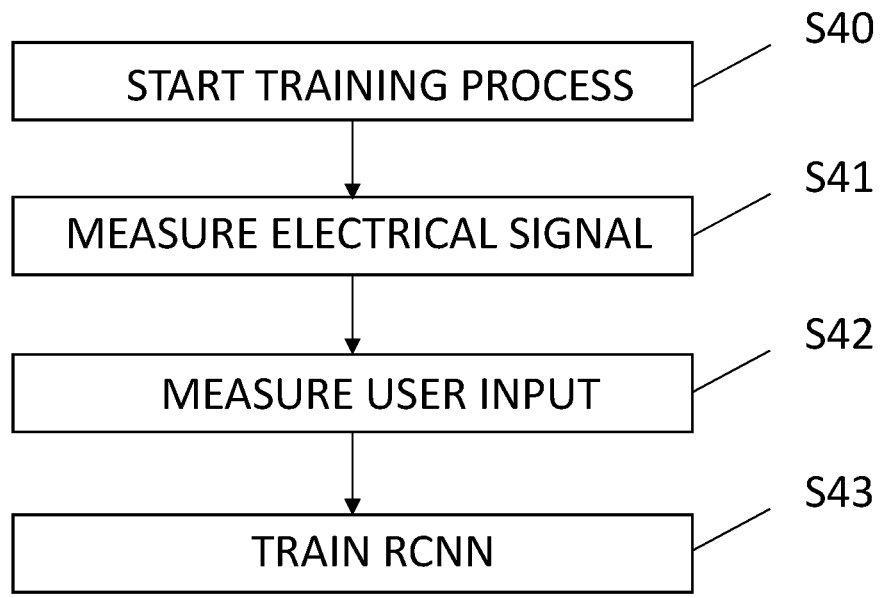
FIG. 4 is a flowchart showing steps for training a recurrent convolutional neural network.

FIG. 4 is a flowchart that shows the steps for training a RNN to be stored on the controller 1. At step S40, the training process begins. The training process may be initiated by a user. Alternatively, the controller 1 or console 32 may indicate to a user that a training process needs to be performed. As described above, the user will be guided through a series of operations on the controller 1, such as pressing the buttons 13 or moving the joystick 12. The instructions may guide the user through all possible operations on the controller 1.

In step S41, while the user performs the operations, the controller 1 samples electrical signals from the electrodes 14 to generate a sequence of electrical signal data and stores the electrical signal data in the memory 22.

In step S42, while the user performs the operations, the controller 1 measures user inputs from the input devices 20 to generate sequences of measured user movement data. As there are multiple input devices 20, there may be several sequences of measured user movement data. The sequences of measured user movement data are stored as data in the memory 22.

In step S43, after the user has completed the operations on the controller 1, the sequence of electrical signal data and the sequences of measured user movement data are stored in the memory 22 as training data. The training data is used to train a RNN using conventional techniques and the resulting trained RNN is stored in the memory 22 of the controller 1. After training of the RNN, the training data may be deleted from the memory 22.

In the above described implementations, the training is performed as a separate step and the user is provided with guidance during the training process. In further implementations, electrical signal data and measured user movement data may be collected during normal use of the controller 1 and a new neural network may be trained or an existing neural network may be updated without a separate user-guided training process. In this way, a new trained neural network may be generated, and, in some examples, the neural network being used for inference replaced without the need to disrupt the user. In some implementations, the measured user movement data may be analyzed to see which types of user action have been measured during normal use. In a case that one or more user actions in connection with input devices 20 are not included in the measured user movement data and electrical signal data collected during normal use, the user may be guided to perform those user actions that are not included in the data collected during normal use.

Following training of the RNN, the controller 1 may be used to provide instructions to the console 32. The function of the trained RNN is to reduce latency in the interface between the user of the controller 1 and the console 32 as will be described with reference to FIG. 5. Following that, a control method for reducing output of inaccurate instructions from the controller 1 will be described with reference to FIG. 6.

Figure 5:
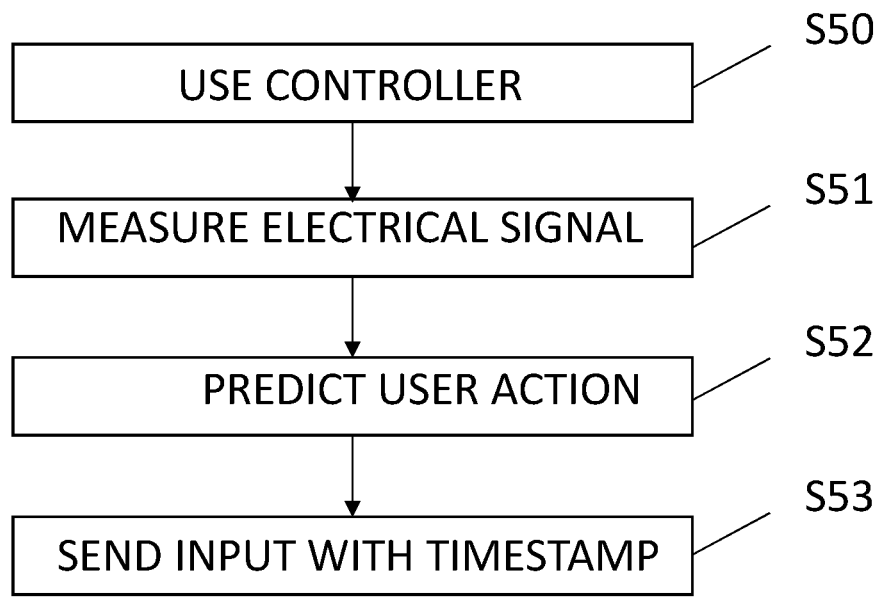
FIG. 5 is a flow chart showing steps for outputting a predicted user action using the recurrent convolutional neural network.

FIG. 5 is a flow chart showing steps to output a predicted user input using the RNN. In step S50, the controller 1 is in use. This means that a user is holding the controller 1, the controller 1 is operational, and the controller 1 is connected to the console 32. There may be different steps to make the controller 1 operational, such as switching a power button on the controller 1 to power the controller on.

In step S51, the controller 1 measures electrical signals from the electrodes 14 with a sampling frequency determined by reference to the signal from the timer 25.

In step S52, the electrical signal data is input to the trained RNN and inference is performed by a processing unit in the form of processor 21 to predict an input to the controller 1 that may be expected from the user based on the measured electrical signals.

In at least some situations, there will be a correlation between the measured electrical signals measured by the electrodes 14 and the subsequent action performed by a user on the controller 1. This could be because the measured electrical activity measured from the skin of the user is associated with muscle activity for a muscle activation directly involved in an input action on the controller 1. In other cases, the measurement may also be indirectly related to the actual input to the controller 1. For example, a user may involuntarily or habitually move the controller in a certain way when the user makes a particular input and so the measured electrical activity may be associated with the involuntary or habitual movement associated with a particular input rather than directly measuring the muscular motion used to make the input to the controller 1.

By predicting the input using the trained RNN the controller 1 may determine with an acceptable degree of certainty the input to the controller 1 earlier than it could be determined by measuring the input devices 20 directly. Further, as explained above, by analyzing the predicted time sequence of user movement that is output from the RNN an estimated timing of a predicted user action may be obtained as well. A predicted user action may correspond to the predicted time sequence of user movement from the RNN (e.g. predicted output from a joystick indicating a position of the joystick) or a predicted user action may be derived from the predicted time sequence of user movement from the RNN (e.g. the RNN may predict output of a switch associated with a button and the user action may be derived from the predicted time sequence as the time at which the predicted signal changes).

In step S53, a predicted user action may be sent from the controller 1 to the console 32. The predicted user action is not an actual measured input to the controller 1, but instead an action that is predicted based on the electrical signals received from the electrodes 14. Accordingly, while an actual measured user action may be sent to the console 32 with a timestamp based on the timer signal from timer 25, the predicted user action is sent to the console 32 with a timestamp that is adjusted to be later than the current time based on the timer signal. The timestamp is adjusted to be the time that the actual user action would be expected. The extent of the adjustment is determined based on the estimated time delay between prediction and action determined by the RNN. In other embodiments a fixed timestamp offset may be used.

By sending predicted user actions to the console 32 with a timestamp that is later than a current time, the controller 1 has the effect of reducing latency in the gaming system 3. The console 32 can process the predicted user action earlier than would otherwise have been the case causing the display response to user input to appear reduced i.e. reducing the apparent latency in the gaming experience. There are many ways to make use of the predicted user action and these will be described later.

Figure 6:
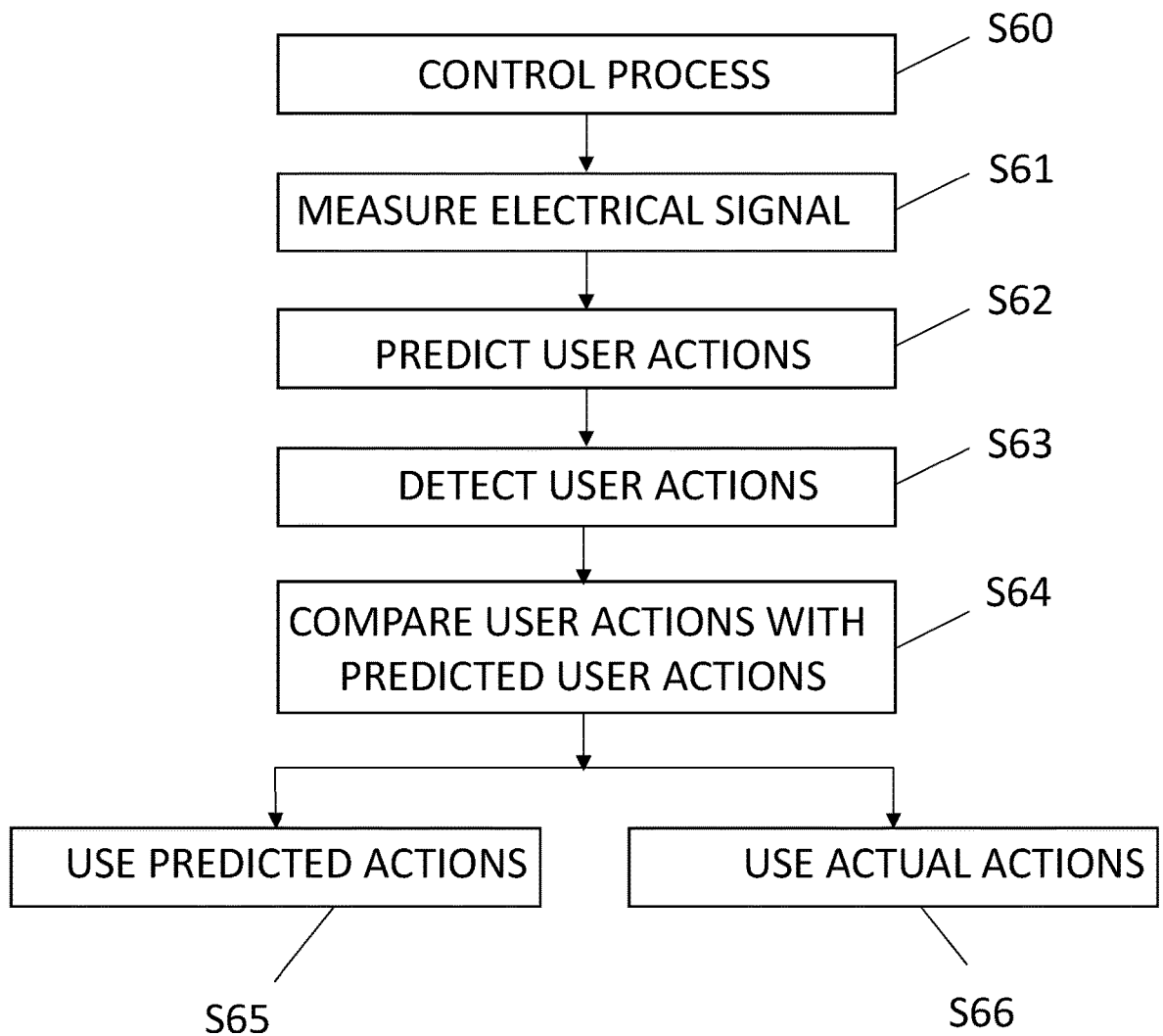
FIG. 6 is a flow chart showing steps of a control process within a controller.

FIG. 6 is a flow chart that shows steps in a control process within the controller 1. The control process is performed in this embodiment by the processor 21 and memory 22. As will be described, the processor 21 and memory 22 together take the functions of a comparison unit and a control unit. As will be explained in more detail below the functions of determining a reliability of the predicted user actions and controlling a process based on the predicted user actions may be performed in different devices.

The method described above in connection with FIG. 5 is useful for reducing latency. However, unfortunately, there are several factors that mean that the method is subject to failures. In some use cases a user may not hold the controller 1 as intended or may not create a good contact between the user's skin and the electrodes 14. The quality of the skin-electrode contact may also be affected by factors such as the moisture levels on the user's skin, whether the user is wearing a covering such as a bandage, etc. Additionally, even in the case of good skin contact, the position of the electrodes 14 with respect to the user's hand will depend upon the size of the user's hands and/or grip stance.

The system may overcome some of the above difficulties by regularly re-training the RNN. For example, the RNN may be trained at the start of each gaming session when the controller 1 is turned on, at the loading of each game, or after a predetermined time period. However, there will be situations in which the signals received from the electrodes 14 do not contain information that allows reliable predictions of user input actions to be made.

At step S60 the control process is initiated. The control process may be run continuously or periodically while the controller 1 is active. At step S61 the electrical signals from the electrodes 14 are sampled in accordance with the timer signal from the timer 25. This step is the same step as S51, which is to say that the same sampled electrical activity measurements may be used both for inference described in connection with FIG. 5 and for the control process.

At step S62 the RNN is used to predict the user input. This step is the same as step S52 and the predicted user inputs from the inference process can be used in the control process.

In step S63, an actual user input is detected by measuring input devices 20 at a frequency determined by the timer signal from timer 25 to generate measured user movement data. The measured user actions may relate to pressing one of the buttons 13, moving the joystick 12 or pressing the directional controller 1. In the case of, for example, pressing a button a user action (pressing the button) may be determined from the user movement data as a time when a signal from a switch associated with the button changes in response to the user pressing the button. In the case of, for example, the joystick a user action from the user movement data may be a change in an output value measured from the joystick 12 which indicates a position that the joystick is held in by the user. Accordingly, for analog input devices, such as the joystick 12, a user action may be a change in the analog input, such as a change in the joystick position.

In step S64, user actions from the measured user movement data are compared with predicted user actions over an appropriate time window. The comparison includes comparing the identity of the user action and predicted user action as well as the timing of the predicted user action in comparison to the actual time of the user action. In some implementations it may be more important for the identity of the predicted user action to be correct than the precise timing. In the context of playing a game it will be more disconcerting for a user if the controller 1 mistakenly predicts a button press, which might have a significant impact in the game, than if the timing of the button press is inaccurate by a few milliseconds. For example, some input devices 20 are analogue in nature, such as pressing a trigger on a controller, so the precise trigger timing is inherently unclear or difficult for a user to notice. Accordingly, in step S64 the controller 1 may monitor a number of incorrectly predicted user actions (a failure rate) over a predetermined time period, such as 5 minutes, and compare the number of incorrect predicted user actions with a predetermined threshold. If the number of incorrect predicted user actions exceeds the threshold, such as two, the controller 1 may determine that the predicted user actions from the RNN are not reliable.

If the predicted user actions are reliable, the control process may proceed to step S65 and the controller 1 may continue to use the predicted user actions to control the game as described in connection with FIG. 5. Alternatively, if the number of incorrect predicted user actions exceeds the threshold in a time period, the control process may cause the controller 1 to stop using the predicted user actions and use the actual measured user actions detected from the input devices 20 instead. In some implementations, the control process may be repeated and the use of predicted user actions may be allowed again if future predicted user actions become more reliable.

There are several different options for communicating the predicted user actions in step S65 or the actual user actions in step S66 from the controller 1 to the console 32. In one implementation, the controller 1 may send information about the predicted user actions, with the modified timestamp, to the console 32 in the case that the controller 1 determines that the predicted user actions are reliable. In a case that the controller 1 determines that the predicted user actions are not reliable, the controller 1 may not send the predicted user actions to the console 32, but instead send to the console 32 the actual user actions with a timestamp determined based on the timer signal from the timer 25.

It is noted that in order to get the benefit of improved latency the predicted user actions need to be sent by the controller 1 to the console 32 before the time that the corresponding actual user actions have been received and would be sent to the console 32. Accordingly, the control process described in connection with FIG. 6 controls how user actions are sent to the console 32 based on the accuracy of previous predicted user actions in the time sequence. The controller 1 does not wait to check the accuracy of any particular predicted user action before sending the predicted user action to the console 32.

In other implementations, the controller 1 may send data about both the predicted user actions and the actual user actions to the console 32 along with a control signal that indicates the current level of accuracy of the predicted user actions to the console 32.

In some implementations, when the failure rate is determined to be above a threshold in step S64, this may trigger a process for training of a new neural network based on electrical signal data and measured user movement data.

In the implementations described above the processing of the RNN and the control process are performed by the controller 1. In yet further implementations, the controller 1 may send electrical signal data relating to the electrical activity measured by the electrodes 14 and the user movement data measured from input devices 20 to the console 32 as raw data. In such an implementation, the console 32 will receive the electrical signal data relating to the measured electrical activity relating to a particular user input in advance of the corresponding measured user movement data. The console 32 may store and perform inference using the RNN in order to generate predicted user actions in advance of receiving the actual measured inputs. Such implementations may have the advantage of reduced calculation time for the inference processing of the RNN due to increased processing capability at the console 32 compared to the controller 1. If the controller 1 is battery powered, the battery life of the controller 1 may also be improved by this technique.

The comparison and monitoring described in connection with step S64 above may be performed on an input device-by-input device basis. Due to the user's hand positioning, the prediction of some user interactions with the controller 1 may be more accurate than the prediction of other user interactions. For example, the control method may find that predictions of user actions relating to the four-way controller 11 are reliable, but predictions of user actions relating to the group of buttons 13 are unreliable. In use, some input devices 20 may be used more often and/or be more latency sensitive than others. For example, joystick 12 and four-way controller 11 may be used more regularly. On the other hand, the group of buttons 13 may be used less frequently and/or be less latency sensitive. The controller 1 may monitor a failure rate for incorrectly predicted user actions for one or more different input devices 20 and separately control whether the predicted user actions or the measured actual actions are used in connection with those different input devices in steps S65 and 66 on a input device-by-input device basis.

In each of the implementations described above, the console 32 has two modes of operation. If the predictions from the RNN are sufficiently reliable the console 32 may operate based on the predicted user actions, which may have the benefit of lower latency. In a case where the predictions from the RNN are not sufficiently reliable the console 32 may operate based on the actual user actions to the controller 1. The user actions may be used for any purpose by the console 32. A typical use of the user actions/predicted user actions is to control a movement or other action within a game. A movement or action will typically be shown by a change in the displayed image on the television 33. This change will be a result of the rendering of new image frames by the console 32. In a case where the predicted user actions are reliable, the later timestamp allows the overall time between the user inputting an action into the controller 1 to the effect of that action being displayed on the television 33 to be reduced. The advance in time, or negative latency, caused by the prediction by the RNN may be offset against latency caused by transfer of signals from the controller 1 to the console 32, time taken to render new images in response to the user action and the time taken to transfer image data to and drive the television 33.

In some implementations, the rendering at the console 32 may be predictive rendering in which the console 32 renders several frames in advance of the current state of game play. In some embodiments, the console 32 may render in advance based on the predicted user actions and then output the rendered frames based on confirmation in the measured user movement data. This process allows a reduction in latency because, as long as the predicted user action is correct, no delay for rendering the frame is required when the user action is detected from the measured user movement data.

In accordance with the control process described in connection with FIG. 6, if the predicted user actions generated from the RNN become unreliable, the human-machine interface system will fall back to using the actual user actions from the measured user movement data. When this happens, there will be a shift in the timestamps as the controller 1 moves from applying timestamps for predicted user actions to timestamps for measured user actions, which as described above are offset from each other. In many cases this change will not have a noticeable effect for the user because for the short time period of the offset, the game may be configured to continue as it would if the existing user actions are continued (i.e. no change).

It was mentioned earlier that FIG. 3 shows a band 1a. In some embodiments, the user may wear a band 1a around their arm. The band 1a may be a separate device from the controller 1 or may be integrated with the controller 1. The band 1a may take the form of a smart watch or a fitness tracker.

Figure 8:
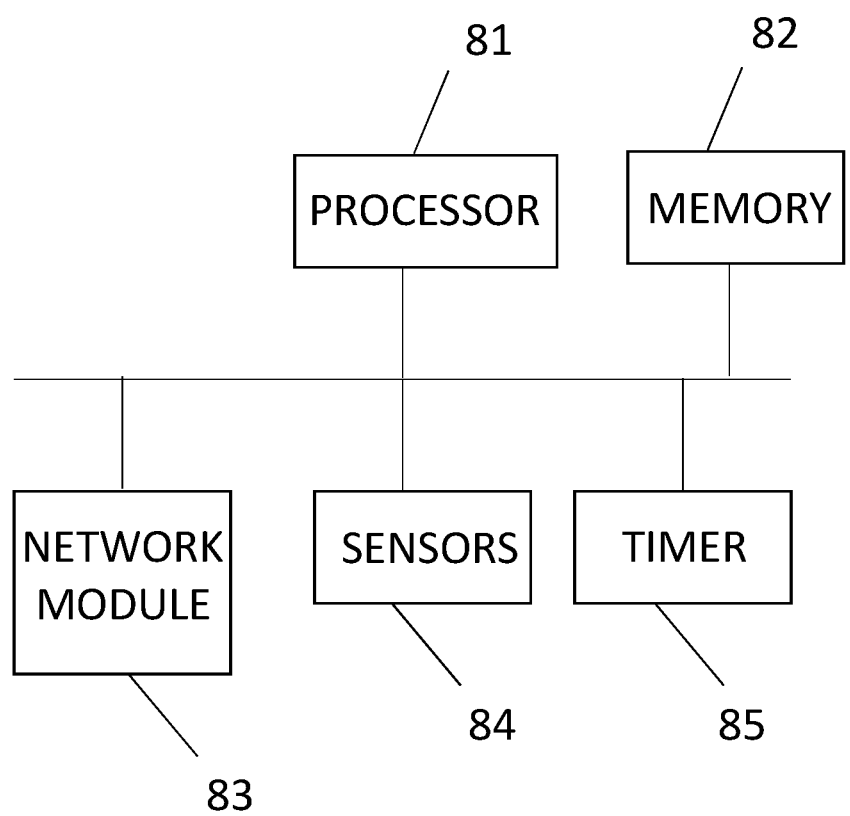
FIG. 8 is a schematic diagram of components of a band.

FIG. 8 is a schematic diagram showing hardware of the band 1a. The band 1a comprises a processor 81, a memory 82, a network module 83, sensors 84 and a timer 85. The band 1a can communicate with the controller 1 using the network module 83. The communication may occur by wireless connection, such as Bluetooth® or via a wired connection. In other implementations, the band 1a may communicate with the console 32 and controller 1 or only communicate with the console 32. The sensors 84 are electrodes provided on an inner surface of the band 1a located to make contact with the user's skin and read electrical activity from the surface of the user's skin. The timer 85 is configured to provide a timer signal that governs a sampling rate of one or more electrical signals from the sensors 84. The timer may also provide a timestamp that is included in electrical signal data generated from the one or more electrical signals. In some implementations the timer 85 may operate at the same frequency as the timer 25 of the controller 1.

In use, the band 1a samples electrical signal values measured from the sensors 84 and sends the sampled electrical signal data to the controller 1.

In the present embodiment, the controller 1 is as described above and includes electrodes 14 in the hand grips. In other implementations, the controller 1 may not include electrodes 14 in which case the band 1a provides electrical signal data from electrodes 84 in place of the electrodes 14 on the controller 1 and the system operates as described earlier. In another embodiment, the electrical signal data from electrodes 84 on the band 1a and electrical signal data from electrodes 14 on the controller 1 may be input to a single RNN. In this embodiment, the system again operates as described earlier because the two set of electrodes 14 and set of electrodes 84 can be considered to form a single extended set of electrodes.

In the present embodiment there are two sets of electrodes, a first set 14 on the controller 1 and a second set 84 provided on the band 1a. The electrodes are located on different parts of the user's skin and will measure different electrical activity. At the controller 1 (or, in other implementations at the console 32) a first RNN is trained for the set of electrodes 14 on the controller 1 and a second RNN is trained for the set of electrodes 84 on the band 1a. Each RNN is trained in the same way as previously described based on data measured from the respective set of electrodes while a user performs a set of operations on the controller 1. The operations only need to be performed by the user once as the controller 1 can record the measured user movement data, electrical signal data from the first set of electrodes 14 and electrical signal data from the second set of electrodes 84 at the same time.

In use, electrical signal data from the first set of electrodes 14 is used for inference with the first RNN and a first set of predicted user actions is generated. Electrical signal data from the second set of electrodes 84 is used for inference with the second RNN and a second set of predicted user actions is generated.

As before, use of the predicted user actions from the first RNN and second RNN to control a process is based on a control process that monitors that accuracy of the predicted user actions. The predicted user actions from the first RNN and the second RNN are each separately evaluated for reliability by comparison to one or more thresholds for inaccurate predictions of user actions. If both RNN are determined to be reliable by the control process, the controller 1 may output a predicted user input if the predicted user action from both the first and second RNN agree. The first and second RNN may be determined to agree if they both predict the same type of event (e.g. a particular button press) within a threshold time of each other (i.e. the two predictions are close enough in time that the predicted user actions can be said to correspond). The predicted time difference for the timestamp of the predicted user action may be based on an average of the predicted time difference from the two RNN. The predicted user action may be sent to the console 32 from the controller before an actual user action is measured at the controller 1. As the prediction is based on the output from two RNN taking inputs from two sets of electrodes, the agreed predictions may be more accurate.

If only one of the RNN is currently determined to be reliable, the predicted user actions from the RNN that is determined to be reliable is used. If neither RNN is determined to be reliable, the controller 1 falls back to the actual measured user inputs to the controller 1.

Figure 9:
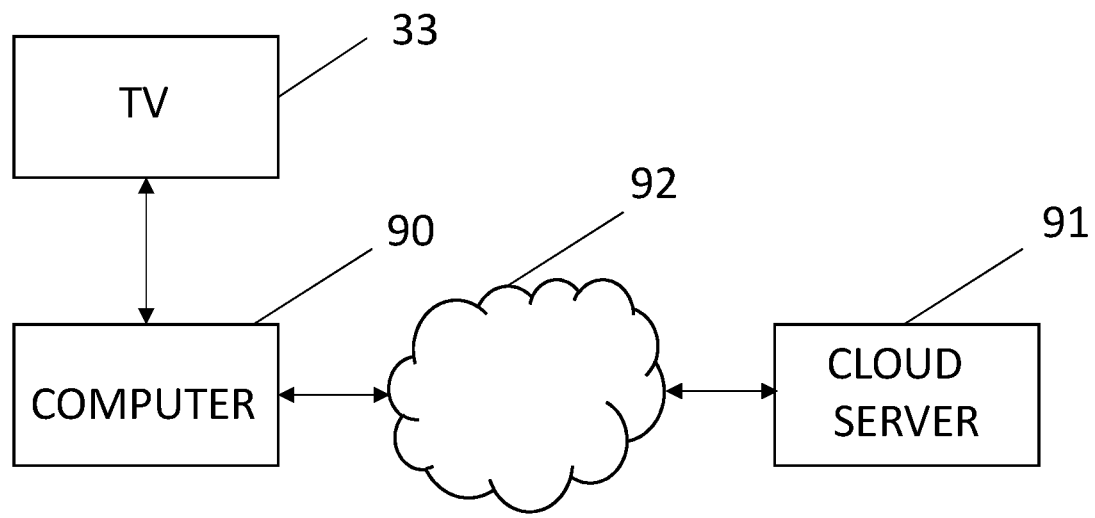
FIG. 9 is a schematic diagram showing a cloud gaming system.
Figure 9:
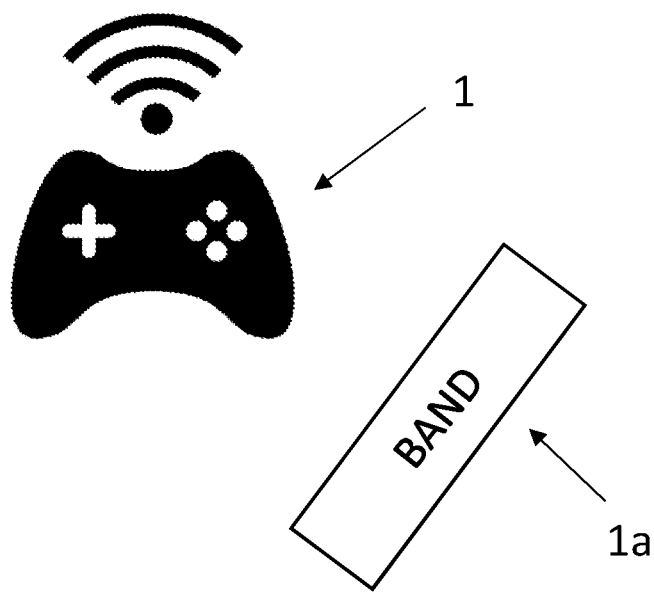

The above described embodiments are based around a controller 1 communicating with a local console 32 over a wireless connection. As mentioned in the introduction, reducing latency is also useful in cloud gaming. FIG. 9 is a schematic diagram showing a cloud gaming system. The controller 1, band 1a and television 33 are the same as previously described and the description above will not be repeated. The controller 1 is configured to communicate by wired or wireless connection with a computer 90. The computer 90 runs a cloud gaming platform that is configured to communicate with a cloud server 91 via the internet 92. In this embodiment, the functions of the console 32 are performed by software running on cloud server 91 and computer 90 serves as a gateway to the cloud server 91. As the cloud server 91 is remote from the controller 1 and the computer 90, communication with the cloud server 91 over the internet tends to introduce considerable latency. As previously described, by predicting user actions based on predictions from a trained RNN (either at the controller 1, at the computer 90 or at the cloud server 91) the latency experienced by a user may be reduced.

The training and inference using the RNN in the human-machine interface system shown in FIG. 9 may take place in one of three places. As described in the earlier embodiments the training and inference may take place on the controller 1. In alternative embodiments, the controller 1 may send the raw electrical signal data generated from the electrode to the computer 90. The controller 1 may also send the measured user movement data measured from the input devices 20 to the computer 90. Accordingly, training and inference of the RNN may take place at the computer 90. Alternatively, the computer may send the electrical signal data and measured user movement data to the cloud server 91 and training and inference of the RNN may take place at the cloud server 91. In each case, the RNN training and inference processes are as previously described.

The human-interface systems described above allow an interface with a user to control a process on a machine in the form of a computer. In the gaming system 3 shown in FIG. 3, the signals from the electrodes 14 allow a user to control a gaming process being run on the console 32. In the human-machine interface system shown in FIG. 9, electrical signals from the electrodes 14 allow a user to control a gaming process being run on the cloud server 91.

The process being controlled is not limited to a gaming process and may include any suitable computer process. Examples of other processes include immersive reality experiences, a process for controlling a remote vehicle such as a drone, or robotic process control such as remote surgery.

The hardware structure of the computer being interfaced with is not important. In the described embodiments, the console 32, computer 90 and cloud server 91 have typical computer hardware including a central processor, a memory and network connection hardware. The computers may have any additional hardware such as, but not limited to, graphics processors, neural network processing hardware, and typical user interface hardware such as monitors, keyboards, mice etc.

Figure 10:
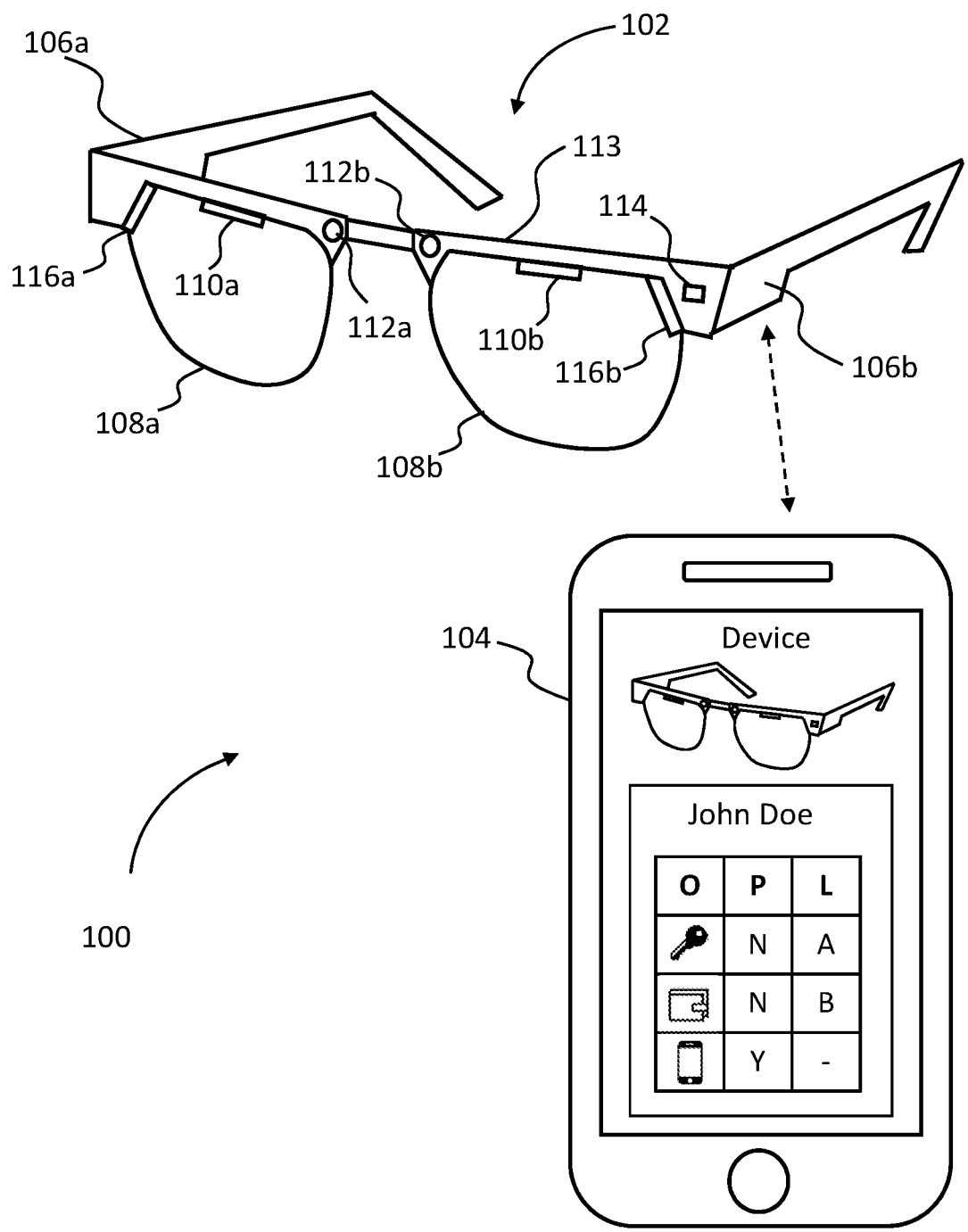
FIG. 10 is a drawing of a pair of smart glasses and an associated app on a smartphone forming part of an extended reality system.

A further embodiment will now be described with reference to FIG. 10. FIG. 10 illustrates a pair of smart glasses 102 and an associated app on a smartphone 104 forming part of an extended reality (XR) system 100. The term 'extended reality' is used in the present application, but the terms mixed reality (MR), virtual reality (VR) and augmented reality (AR) are also used in the art. The term 'extended reality' should be understood in its broadest sense to encompass all those terms and cover all types of immersive technologies.

The smart glasses 102 include a central frame portion 113 and two folding arms 106a, 106b, where the central portion 113 acts as a support for two lenses 108a, 108b. The central frame portion 113 and the arms 106a, 106b house various sensors and user interface components, as will be described below. The lenses 108a, 108b in this example are neutral, though in other examples the lenses could be corrective lenses matching a prescription of a specific user, and/or could be tinted, for example in the case of smart sunglasses. Each of the lenses 108a, 108b is a transparent display on which a corresponding projection component 110a, 110b is arranged to display information for the user.

The central frame portion 113 houses two front-facing cameras 112a, 112b and side cameras (not shown) to capture images surrounding the user. The XR system 100 is arranged to analyze image data generated by the front-facing cameras 112a, 112b using stereo matching to determine depth information. The central frame portion 113 further houses a microphone array 114 for receiving sound input both from the user and from the surrounding environment, and optical eye-tracking sensors 116a, 116b for tracking orientations and motion of the user's right and left eye respectively. The optical eye-tracking sensors 116a and 116b include associated processing circuitry for determining a direction in which the user is looking. The associated processing circuitry may include a neural processing unit (NPU) or an ASIC built into the smart glasses 102. In an alternative embodiment some of the processing for determining the direction in which a user is looking may be performed in a separate device, for example in the smartphone 104. The determination of the direction that a user is looking may be performed in different ways, but in the embodiment is performed using a trained convolutional neural network that can determine a probability that a user is looking in a particular direction based on eye position detected by the optical eye-tracking sensors 116a and 116b. The arms 106a, 106b house a dedicated power supply, processing circuitry and memory circuitry, as well as a global positioning system (GPS) receiver, an electronic compass, and accelerometers. The arms also include a communication module including an antenna for communicating wirelessly with the smartphone 104 running the associated app. It is noted that whilst the wireless communication module allows communication with the mobile smartphone 104, the smart glasses may be used as a standalone device without continuous communication with the smartphone 104.

The smart glasses 102 include speakers (not shown), which cover the user's ears. In other embodiments, the smart glasses 102 are coupled to in-ear headphones, e.g. by Bluetooth®, and can provide sound to a user through the in-ear headphones. In a variant, the arms of the smart glasses 102 include bone conducting speakers, which provide sound to the user by vibration whilst continuing to allow the user to hear what is happening locally.

The AR system 100 is arranged to determine a position (i.e. location and orientation) of the user using the onboard GPS receiver and the electronic compass of the smart glasses 102, and/or by processing image data from the cameras 112a, 112b using simultaneous localization and mapping (SLAM). The XR system 100 is configured to continually monitor the position of the user, but in other embodiments may determine the position of the user only when certain events are detected (for example, when movement of the user is detected by the accelerometers). In other embodiments, GPS positioning information may be provided by a connected Smart Phone. Alternatively, or in addition, location and orientation information can be provided using SLAM.

XR systems including various combinations of the features described above are available commercially. Examples include Microsoft® Hololens® 2 and Magic Leap® 1.

The app on the smartphone 104 can be used to configure the smart glasses 202 in accordance with preferences of the user. For example, the user can use the app to select the type of information that is displayed on the lenses 108a, 108b, and whether the smart glasses 102 continually monitor the location of the user as mentioned above. The app has associated storage on the smartphone 104, which may be used in addition to the memory circuitry of the smart glasses 102 to store data for use by the XR system 100. The XR system 100 can further utilize processing capabilities of the smartphone 104 to perform certain resource-intensive processing tasks, such as SLAM. Sharing the storage and processing requirements of the AR system 100 between the smart glasses 102 and the smartphone 104 allow for the size, weight and form factor of the smart glasses 102 to be similar to a regular pair of glasses, such that a user can comfortably wear the smart glasses 102 for prolonged periods of times, and on an everyday basis. Although the smart glasses are described in conjunction with a smartphone 104 in this figure, the smart glasses may be configured as a standalone device.

Electrodes (not shown) may be provided on the inner surface of the central frame portion 113 close to the user's eyes. The electrodes, when the user is wearing the smart glasses 102 are arranged to contact the user's skin.

In this embodiment, electrical signals are measured from the electrodes close to the user's eyes are used to predict when a user may blink. The blinking may be measured by measurement units in the form of the optical eye-tracking sensors 116a and 116b. In a modification of the methods described above, a RNN may be trained based on measurements from a user over a training period in order to predict blinks from electrical signals measured from the electrodes.

As with earlier embodiments, a control process monitors the accuracy of predictions from the RNN against actual blinks measured by the eye-tracking sensors 116a and 116b. If the accuracy is below a threshold level of accuracy, the predicted blinks are not used.

The ability to predict when a user is going to blink may be useful in smart glasses and other extended reality systems that make use of foveated rendering or other rendering techniques. Foveated rendering is a technique which uses an eye tracker in smart glasses or other virtual reality headset to reduce rendering workload by reducing the image quality in the peripheral vision of a user. The reason for reducing the image quality is that human vision typically has high quality in an area gazed upon by the fovea of the eye, but lower quality toward the periphery. Accordingly, the user typically does not notice lower quality graphics away from areas of the display that the user is focused upon.

In the embodiments above, the ability to predict when a user may blink may allow improved rendering because it may not be necessary to render images during the period in which the user blinks, which may be in the order of 1/10 of a second. Further, the user's eye may have moved during the blink in which case it may be necessary to render a larger area or all of the image with higher quality until the location of the user's attention can be determined by the eye-tracking sensors 116a and 116b and foveated rendering can be resumed.

In other embodiments using the smart glasses 102, the electrodes on the smart glasses may collect signals from around the user's eyes in order to allow prediction of a direction that the user may look. As before the eye-tracking sensors 116a and 116b allow measurement of the actual direction in which the user is looking so that a RNN may be trained and used for inference. Additionally, using the same principles as previously described, the predicted directions of the user's gaze may be compared with measured directions from the eye-tracking sensors 116a and 116b in a control process in order to control whether or not the predicted directions of the user's gaze are reliable.

Predicted directions of a user's gaze may be useful for foveated rendering because it allows determination of which parts of the image displayed on the lenses 108a and 108b need to display higher quality images because they are the focus of the user and which parts of the image will be in the peripheral vision of the user and may be rendered with a lower quality than the areas of the image that are the focus of the user.

Predicted directions in which the user is looking and blinking may also be used as inputs to a device. Such an arrangement is possible for both human-machine interface systems that use a display such as a TV or monitor and extended reality applications.

The techniques described above are also suitable for application to interfaces that use gesture-based control. An example would be control of a robotic arm based on a user's arm movement. In some such implementations, a user may wear a band of the type described above connected to a console and the console may comprise an image capture device that is operable to capture video of a user. In use, the band acts as a sensor that sends electrical signal data to the console and the image capture device acts as an input device that is capable of measuring user movement. As described above, a neural network may be used to predict user movements that will be detected based on image recognition performed on images captured by the image capture device. As before, the predicted user movements may be used to reduce latency as they may be obtained earlier than the actual user movements measured from images captured by the image capture device. In this way, more responsive control of, for example, a robotic arm may be achieved.

In another example of gesture-based control, the user may make hand gestures that are recognized by a camera i.e. the user makes signs to the camera. Such systems may be implemented in various settings, such as using a camera on an extended-reality headset. Gestures may be recognized from video captured by the camera using image recognition technologies. However, it can be difficult to recognize a human hand depending on the color of the skin and the background. In some techniques the user may be provided with a glove to aid image recognition. In further embodiments, the glove may include electrodes on an inner surface of the glove to collect electrical signals from the wearer. A neural network can be trained based on signs made by the user and recognized by the camera and the measured signals from the electrodes in the gloves using the techniques described above. As the user moves around, a case may arise in which the background and the color of the gloves makes image recognition difficult. Predictions from the trained neural network may be used in this case, the predictions being based on the electrical signal data from the sensors in the gloves. The predictions from the neural network may be used to generally increase reliability and may also help in situations in which the user looks away temporarily from the gesture being made or in which a head mounted camera is moving a lot making image recognition more difficult.

The embodiments above are focused on the use of surface electromyography in which electrical signals are read from the skin of a user based on electrodes 14 on a controller 1, on a band 1a, or based on electrodes on a pair of smart glasses. In other embodiments, electrodes in the form of sticky pads may be placed by a user on their skin and the electrodes may be connected back to the controller 1 or smart glasses 102. The relation of the electrical signals to the human body would vary depending on placement of the electrodes and the techniques above involving the use of a RNN and a control process are applied.

The invention is not limited to surface electromyography and implementations in which intramuscular electrical signals are obtained may be contemplated. For example, fine needles may be inserted into the body (similar to acupuncture) and intramuscular electrical signals may be read as part of a human interface system. Such implementations would obviously need appropriate precautions to be taken for the user's safety and wellbeing.

In further embodiments, an accelerometer worn by a user could be used as the sensor. The acceleration associated with the start of a movement may allow a movement to detected before a user action is measured at an input device or otherwise. The human-machine interface may comprise a plurality of accelerometers. The neural network receives input from the one or more accelerometers and the measured accelerations may be used to predict subsequent user actions using a neural network.

The embodiments above describe the use of a RNN to predict a user action as well as a time of the predicted user action in order to modify the timestamp. However, this may be done in other ways. For example, a first neural network, such as a convolutional neural network, may predict the identity of user action based on a set of electrical activity measurements from a set of electrodes. The time delay could be determined as a fixed time delay. In further embodiments, a second neural network, such as a convolutional neural network, may be configured to predict the time delay. The second neural network may be trained based on a time delay between the time of measurement of the electrical activity measurements that the first neural network used to predict a user action and the actual timing of the corresponding measured user action. Both neural networks could be trained based on training data collected from a user operating a controller 1.

The above described neural network is trained for a user as described above in connection with FIG. 4. The trained neural network may be stored on the console 32, the controller 1 or elsewhere such as in the cloud, in association with a user's identity so that it can be accessed later. The user may tend to handle the controller 1 in one of several different ways, perhaps varying the way that the user holds the controller 1 during a single game play. Accordingly, a plurality of different trained neural networks may be stored in association with a single user's identity.

In some implementations, during use, the electrical signal data from electrodes 14 may be processed by multiple neural networks associated with a user identity. The reliability of each neural network may be monitored using the process described in connection with FIG. 6 in order to determine a failure rate of the predicted user actions from each neural network over a predetermined time period, such as the last 5 minutes. The predicted user actions from the neural network with the lowest failure rate over the most recent predetermined period, as long as the failure rate is below the threshold failure rate, may be used to control the process (computer game). In this way, during use of the controller, if the user shifts their grip on the controller 1 which may alter the input being received, the neural network used to predict the user actions may shift from one neural network to another neural network. In other implementations, a neural network may be used until its failure rate exceeds a threshold at which point another neural network associated with the user identity may be selected. The selected neural network may be neural network with the lowest failure rate at the time of switching.

What is claimed is:

1. A human-machine interface system comprising:
a sensor configured to generate data associated with a human movement;
a second sensor configured to generate further data associated with a human movement;
a measurement unit configured to measure user movement over time to generate a sequence of measured user movement data;
a processing unit configured to process the data associated with a human movement from the sensor using a trained neural network to determine a plurality of predicted user actions and to process the further data associated with a human movement from the second sensor using a second trained neural network to determine a plurality of predicted user actions;
a comparison unit configured to compare the one or more predicted user actions of the plurality of predicted user actions from the first neural network with one or more user action obtained from the sequence of measured user movement data and to compare the one or more predicted user actions from the second trained neural network to the one or more measured user actions from the sequence of measured user movement data; and
a control unit configured to use one or more predicted user actions of the plurality of predicted user actions to control a process in an information processing apparatus in dependence upon the comparison performed by the comparison unit.

2. A human-machine interface system according to claim 1, wherein the control unit is configured to use at least one of: one or more predicted user actions from the trained neural network, one or more predicted user actions from the second trained neural network, and the one or more measured user actions from the sequence of measured user movement data to control the process in information processing apparatus in dependence upon comparison performed by the comparison unit.

3. A human-machine interface system comprising:
a sensor configured to generate data associated with a human movement;
a measurement unit configured to measure user movement over time to generate a sequence of measured user movement data;
a processing unit configured to process the data associated with a human movement from the sensor using a trained neural network to determine a plurality of predicted user actions;
a comparison unit configured to compare a type of the predicted user action with a type of a corresponding user action from the measured user movement data, and to monitor a failure rate at which predicted user actions do not have a corresponding user action or the type of a corresponding user action from the measured user movement data does not match a predicted type of user action and to compare the failure rate with a predetermined threshold value; and
a control unit configured to use one or more predicted user actions of the plurality of predicted user actions to control a process in an information processing apparatus in dependence upon the comparison performed by the comparison unit.

4. A human-machine interface system according to claim 3, further comprising
a second sensor configured to generate further data associated with a human movement, wherein the sensor and the second sensor are located on different devices and configured to generate data associated with a human movement from different parts of the user,
wherein the processor is configured to receive the data associated with a human movement from the sensor and the further data associated with a human movement from the second sensor and to process the received data associated with a human movement and further data associated with a human movement using the trained neural network.

5. A human-machine interface system according to claim 3, wherein the comparison unit is configured to separately monitor failure rates at which predicted user actions do not have a corresponding user action from the measured user movement data for different types of user action and to compare the failure rates with one or more predetermined threshold values.

6. A human-machine interface system according to claim 3, wherein:
the processing unit is configured to process the data associated with a human movement using a plurality of trained neural networks associated with a user to determine the one or more predicted user actions;
the comparison unit is configured to compare the one or more predicted user actions from the plurality of trained neural networks with one or more user actions obtained from the sequence of measured user movement data;
the comparison unit is configured to determine a most reliable trained neural network of the plurality of trained neural networks associated with a user based on the comparison; and
the control unit is configured to use one or more predicted user actions from the neural network determined by the comparison unit to be the most reliable trained neural network to control the process in the information processing apparatus.

7. A human-machine interface system comprising:
a sensor configured to generate data associated with a human movement;

a measurement unit configured to measure user movement over time to generate a sequence of measured user movement data;

a processing unit configured to process the data associated with a human movement from the sensor using a trained neural network to determine a plurality of predicted user actions and a plurality of timings corresponding to the plurality of predicted user actions, the neural network configured to receive a sequence of data associated with a human movement that is associated with a first time window;

a comparison unit configured to compare the one or more predicted user actions of the plurality of predicted user actions with one or more user action obtained from the sequence of measured user movement data; and a control unit configured to use one or more predicted user actions of the plurality of predicted user actions to control a process in an information processing apparatus in dependence upon the comparison performed by the comparison unit.

8. A human-machine interface system comprising:

a sensor configured to generate data associated with a human movement;

a measurement unit configured to measure user movement over time to generate a sequence of measured user movement data;

a processing unit configured to process the data associated with a human movement from the sensor using a trained neural network to determine a plurality of predicted user actions;

a comparison unit configured to compare the one or more predicted user actions of the plurality of predicted user actions with one or more user action obtained from the sequence of measured user movement data; and a control unit configured to use one or more predicted user actions of the plurality of predicted user actions to control an image rendering process in an information processing apparatus in dependence upon the comparison performed by the comparison unit, wherein:

using the one or more predicted user actions to control the rendering process allows rendering of images with lower latency than by using one or more user actions obtained from the sequence of measured user movement data to control the rendering process; and the control unit is configured to control the rendering process to use one of the predicted user actions and the user actions obtained from the sequence of measured user movement data in dependence upon a failure rate of the predicted user actions determined by the comparison unit.

9. A head-mounted human-machine interface system comprising:

a sensor configured to generate data associated with a human movement, the sensor comprising an electrical contact for collecting electrical signals from are area around a user's eye;

a measurement unit configured to measure user movement over time to generate a sequence of measured user movement data, the measurement unit comprising an eye-tracking sensor;

a processing unit configured to process the data associated with a human movement from the sensor using a trained neural network to determine at least one of predicted eye motion of the user and predicted blinks of a user's eye;

a comparison unit configured to compare at least one of the predicted eye motion of the user and the predicted blinks of a user's eye with one or more user actions obtained from the sequence of measured user movement data; and a control unit configured to use one or more predicted user actions of the plurality of predicted user actions to control a process in an information processing apparatus in dependence upon the comparison performed by the comparison unit.

* * * * *